Jan. 26, 1965

K A. PULLEN, JR 3,167,758

ANALOG TO DIGITAL CONVERTER

Filed Aug. 30, 1961

INVENTOR.
Keats A. Pullen, Jr.

Jan. 26, 1965 K. A. PULLEN, JR 3,167,758
ANALOG TO DIGITAL CONVERTER
Filed Aug. 30, 1961 2 Sheets-Sheet 2

INVENTOR.
Keats A. Pullen, Jr.
BY
S. J. Rotondi, A. T. Dupont & P. B. Reece, III

United States Patent Office 3,167,758
Patented Jan. 26, 1965

3,167,758
ANALOG TO DIGITAL CONVERTER
Keats A. Pullen, Jr., Rte. 1, Box 381, Kingsville, Md.
Filed Aug. 30, 1961, Ser. No. 135,084
3 Claims. (Cl. 340—347)
(Granted under Title 35, U.S. Code (1952), sec. 266)

The invention described herein may be manufactured and used by or for the Government of the United States of America for governmental purposes without the payment of any royalties thereon.

This invention relates to an analog to digital converter and more particularly to an analog to digital converter that translates the angular rotation of a device into electrical signals which can be used to control various indicating or recording devices.

The use of analog to digital converters which are adapted for indicating and recording the angular position or rotation of shafts, dials or pointers have found wide use in military, communication and industrial applications. Usually these converters are either of the mechanical type, such as the common mileage indicator mechanism employed in automobiles, or of the continuous rotating electrical switch type. The mechanical devices are generally unsatisfactory for a number of reasons. In such devices, the indication is digitized by some physical means such as a snap action detent or other intermittent motion device which selects the numbers to be indicated. These devices are subject to excessive wear and breakage. They also are subject to limitations in respect to speed since the mechanical parts can tolerate but a limited acceleration. In addition, the torque required to operate such devices may unduly load the driving shaft.

The difficulty experienced with the electrical switch type of converter has been due to practical problems involved in their construction. The converters are generally built up as two relatively rotatable elements one being a commutator plate or drum and the other a set of brushes cooperating therewith. Due to the fact that a brush must possess a finite thickness, it will of necessity either overlap and make contact with two sectors of the commutator plate or drum or will fail to contact either of the two sectors momentarily as the brush transfers from one to another of the sectors. This results in a false voltage pattern being set upon the output leads with either a dual position, or no position of the input shaft being indicated. The output is therefore subject to ambiguity. Relays and solenoids have been used to overcome this ambiguity of indication but the use of such elements is undesirable since they place an operating speed limitation on the converter which may be serious where rapid counting is necessary. There is a limit on how fast a relay or solenoid armature can be moved, with a consequent limit as to how fast the electrical contacts of the relay or solenoid can be closed and opened. Thus, there is a definite speed limitation on apparatus using circuitry including relays or solenoids. Further, relays and solenoids are relatively expensive. Even a relatively simple electrical counter, such as described in the patent to Gow et al., 2,666,912, may require more than thirty relays, plus other attendant circuitry which is complicated and expensive.

Another proposed solution of the ambiguity of indication is the use of a plurality of communicators or preselectors which are synchronized with the output selector. However, systems of the type heretofore known require that additional preselectors be added to the system in a geometric progression for each order or decade of counting unit above unity. For example if the system was to have the recording and indicating capacity of 99, one preselector would be required. If the system was to have a capacity of 999, three preselectors would be necessary. A capacity of 9999 would necessitate the use of six preselectors. It can readily be seen that the total capacity of a system which could be built by the above method would be limited by the excess number of preselectors or communicators required.

Accordingly, it is an object of this invention to provide an improved analog to digital converter which is simpler in construction and can be fabricated easily and inexpensively.

It is a further object of this invention to provide an analog to digital converter wherein high speed shaft rotation and high counting rates will not cause mechanical failure or ambiguity of indication.

It is still a further object of this invention to provide a converter which will furnish either positve or negative counts without introducing an error.

It is an additional object of this invention to provide a converter which is not dependent upon the operating speed of a relay or solenoids.

Still another object of the present invention is to provide a switching device that is not subject to position ambiguity.

It is still another object to provide a converter which prevents brush width from causing false indications.

The novel features of the invention, as well as the invention itself, both as to organization and method of operation, will best be understood from the following description, when read in connection with the accompanying drawings, in which.

Figure 1:
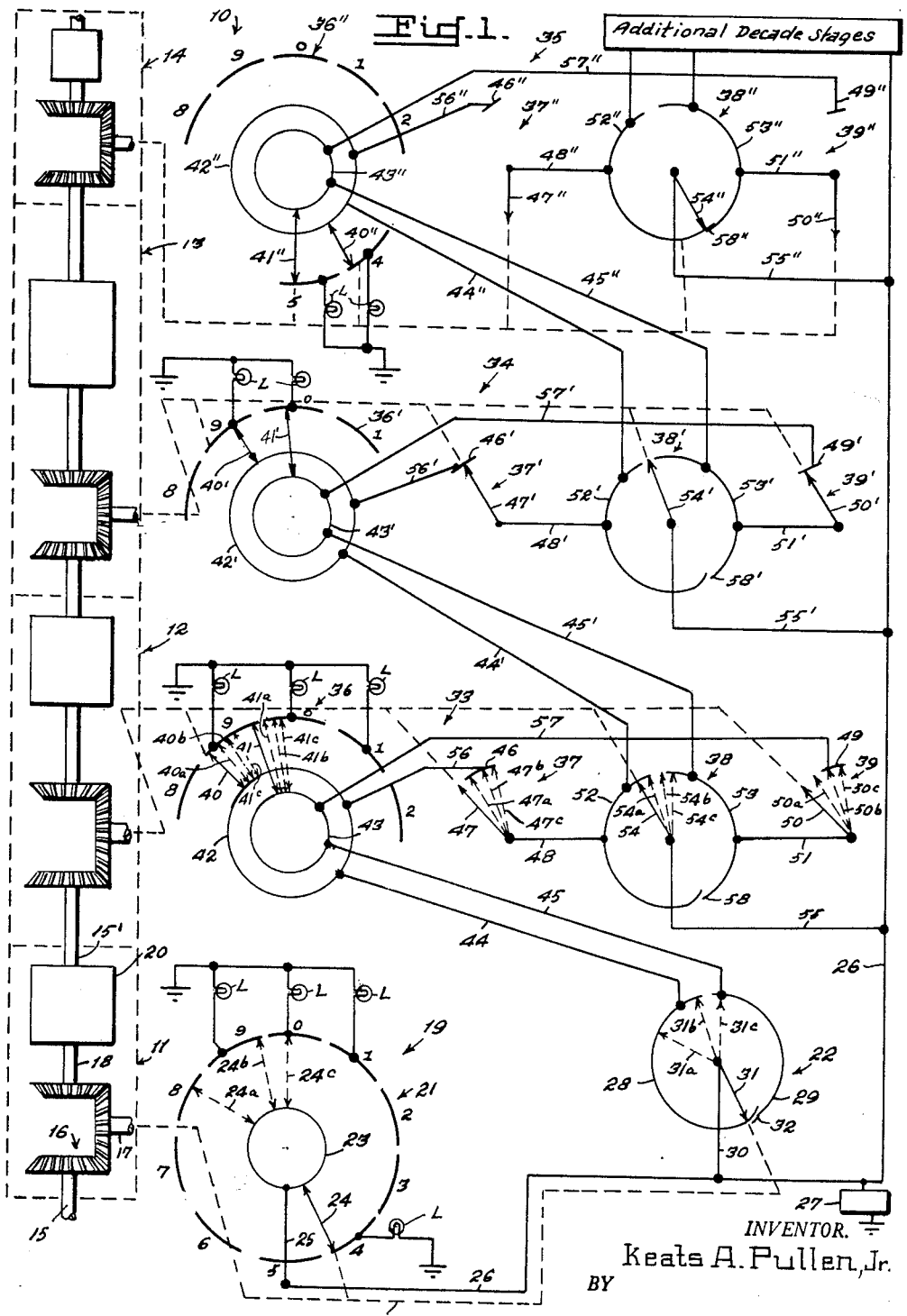
FIGURE 1 is a schematic showing of an analog to digital converter embodying the present invention.

Referring now to FIGURE 1, 10 represents, generally, an analog to digital circuit with the numbers 11 through 14 designating a plurality of gear boxes which are coupled together to drive a "units," "tens," "hundreds" and "thousands" decade unit respectively. Since each gear box is constructed in the same manner, only the first or "units" gear box 11 will be described in detail. Gear box 11 consists of an input shaft 15, the rotation of which is digitally counted by the analog to digital converter in a manner which will hereafter be described. The input shaft is coupled through a gear train 16, having a rotation ratio of 1:1, to shafts 17 and 18. The "units" section 19 of the converter is coupled to and driven by the shaft 17 as indicated by the broken line 17'. Shaft 18 is coupled to and drives a speed reducer 20 having a reduction ratio of 10:1 to the adjacent higher speed shaft. An input shaft 15' is used to couple the output of the speed reducer 20 to the next gear box 12. The analog to digital converter units are coupled electrically in the manner hereinafter described for provision of high speed and accurate converting.

The units section 19, which is the least significant decade, consists of two commutators 21 and 22. The commutator 21 has ten sections which are designated 0 through 9. The sections are coupled successively to a slip ring 23 through brush 24 as shaft 17 is rotated. Electrically connected to the slip ring 23 is a conductor 25 which serves to complete an electrical circuit through the sections 0–9. Each section of the commutator 21 may be connected to a common line or pulse producing means which will produce a signal each time the brush 24 moves from one section to another. However, for the sake of simplicity in explaining the circuit operation, appropriate sections of the commutator 21 are shown connected to a lamp type device "L." Conductor 25 is connected to a common bus bar 26 which supplies power from source 27 to the various units of the converter.

The second commutator 22 consists of two semi-annular sections 28, 29. These sections are connected to the common bus bar 26 by conductor 30 and a brush 31. It should be noted that the sections are so positioned in relationship with one another as to form a shorting type switch position 32. When the contact brush 31 moves across the position 32, the two sections 28, 29 of the commutator 22 are both connected to the bus bar 26 by the brush which is in contact with both sections simultaneously. Once the brush 31 has moved past the position 32, the sections 28, 29 are electrically insulated from one another.

The tens, hundreds and thousands units 33 through 35, respectively, as well as any higher degree decades, require different brush and contact arrangements from that used in the unit decade. Whereas a single brush is required in the unit decade, a pair of brushes 40, 41 are used in the higher decades.

Since each of the tens, hundreds, thousands and higher decades are similar in construction, only the tens decade will be described in detail. However, like numerals followed by a prime or double prime will refer to like parts in the hundreds and thousands decades respectively.

In the tens decade 33 four commutators 36 through 39 are used. The commutator 36 has ten sections which are designated 0 through 9. Two bruhses 40, 41 are adapted to successively couple the section of the commutator to the slip rings 42 and 43. Electrical conductors 44, 45 are connected between the slip rings 42, 43 and the sections 28, 29 respectively. The commutators 37, 39 consist of semi-angular sections 46, 49, brushes 47, 50 and electrical conductors 48, 51, respectively. The conductor 48 is connected to section 52 of the commutator 38 while conductor 51 is connected to section 53. Brush 54 is connected to the common bus bar 26 by conductor 55. A shorting type switch position 58 is provided in the commutator 38. This position is constructed in the same manner as is position 32 of unit 22. The slip rings 42, 43 are connected to the semi-angular sections 49, 46 of commutators 37, 39 by electrical conductors 56, 57, respectively.

The commutators 22, 38, 38' and 38'' are used to insure that the count change in the decade stages takes place at the right instant. Three operations are required of these control commutators. The first of these is to make certain that the count cannot be changed on the next higher decade until the nine to zero or the zero to nine area on the counting commutator of the controlling decade is reached. The second operation is to transfer the count control successively to the lower decades as they all reach the nine–zero transition area. This control is finally transferred to the units decade which then transfers all counts simultaneously. The third operation is to maintain the count at its transferred value until both counting brushes contact the same digit bar. Then control is transferred back to the brush controlling the first operation. The described interval is known as the count-transfer interval.

The operation of the analog to digital converter disclosed in this invention will be better understood by referring to the following operational example.

Assume that a count of 4994 is presently indicated by the circuit 10. In this condition, the brush 24 of commutator 21 is in electrical contact with section 4 thereby establishing a circuit through the power source 27, bus bar 26, conductor 25, slip ring 23, brush 24, the lamp connected to section 4 of the commutator and then to a common ground. In this condition, the lamp L will indicate that a count of 4 has been registered by the unit decade. The brush 31 of the commutator 22 is positioned across both sections 28, 29 at the shorting switch position 32. With the brush 31 in this position, power from source 27 is applied through sections 28, 29 to both conductors 44, 45 and thus to the slip rings 42, 43 of the tens decade stage.

The brushes 40, 41 of the tens decade stage are both shown in contact with section 9 of the commutator 36. It should be noted that it is a necessary condition for proper operation of the analog to digital converter that the two brushes of each of commutator 36'–36'' be positioned on the same section of each commutator when the next lower decade commutators 22, 38–38'' are passing over the shorting positions 32, 58–58''. These contacting arrangements are required to permit the count transfer to take place between nine and zero, and to prevent its taking place between four and five. The reason for these conditions will become more apparent in considering further the operation of the circuit 10. With the brushes 40, 41 both on section 9, only the lamp connected to this section will be furnished power from source 27 through the commutator 22, conductors 44, 45 and the brushes and slip rings of commutator 36. Although conductors 56, 57 are both connected to the slip rings 42, 43, no power is supplied to the conductors 48, 51 because the commutators 37, 38 are not "closed." The brush 54 of commutator 38 is connected to section 52 thus applying power from source 27 through conductor 55, brush 54, section 52, and line 44' to ring 42' of commutator 36'.

The commutator 36' is shown with one brush 40' contacting section 9 while the other brush 41' is in contact with section 0. The brushes 40', 41' will not be in contact with the same section as is true in commutator 36 because the brush 54 of commutator 38 has already passed over shorting position 58. Since the tens and hundreds decade units 33, 34, are mechanically coupled together by a 10:1 gear box, the moving of the brush 54 through one-half its angular movement has caused brush 41' to move from section 9 to 0. Since all the brushes of the hundreds decade unit 34 are movable together, the brush 54' of commutator 38' will be moved to a position exactly between the sections 52', 53' when the brushes 40' and 41' are symmetrically displaced with respect to the gap between section 9 and section 0 of 36'. The brushes 47', 50' of commutators 37', 39' are also moved into contact with sections 46' and 49' thus establishing electrical contact with commutator 36'' through the conductors 44'', 45''.

The brushes 40'', 41'' of commutator 36'' are in contact with sections 4 and 5 respectively while the brush 54'' of commutator 38'' is in electrical contact with section 52''. The brushes 47'', 50'' are not in contact with sections 46'', 49'' of commutators 37'', 39'' and, therefore, no electrical circuit is established. The lamp or indicating device of section 4 is connected to power source 27 through the brush 40'', ring 42'', conductor 44'', section 52', lead 48', brush 47', conductor 56', ring 42', conductor 44', section 52, brush 54 and lead 55 to the main bus bar 26. From this it can readily be seen that the particular sections of commutators 36', 36'' to which power is applied is under control of the commutator 38. Movement of the contact brush 54 from section 52 to section 53 will remove power from slip rings 42', 42'' and place it on slip rings 43', 43'' thereby changing the indicator lamps which are lit in units 34, 35. This switching step may be further explained in the following manner.

Assuming now that the contact 24 has moved to the position indicated at 24a and that contact 31 has moved to position 31a by the rotation of shafts 15, 17 through a rotation of approximately 110°. Under these conditions, section 8 is connected to the power source 27 as is section 28 of commutator 22. Section 29 of the commutator is now electrically insulated from the power source 27. The brushes 40, 41 have also moved from their previous position to the new position 40a, 41a due to the mechanical linkage through the gear boxes 11, 12. The brush 41 of commutator 36 has separated from section 9 and has moved toward contact with section 0 while brush 40 remains in contact with section 9 at position 40a. Brush 54 has moved to the new position 54a and is still in contact with section 52. Brush 50 of commutator 39 has moved to the new position 50a but it still has not made contact with section 49; however, brush 47 of the other commutator 37 has made electrical contact with section 46 as shown by 47a. Under these circumstances it can be seen that the tens decade is practically in position to transfer the control of the hundreds and thousands decades 34, 35, respectively to the unit decade 19.

After the shaft 15 has rotated approximately 40° more, brush 24 is placed in position 24b and contact 31 is in position 31b. The additional rotation of shaft 15 has caused the brushes of unit 33 to move to new positions. Brush 40 is still in contact with section 9 at position 40b but brush 41 is now in contact with section 0 at position 41b. Brush 54 is now positioned at 54b which is midway between sections 52–53 while brush 47 remains in contact with section 46. Brush 50 moves to position 50b and makes electrical contact with section 49.

It can now be seen that the control of the tens, hundreds and thousands decades 33–35 has been transferred to the commutator 22 of the units decade 19. The power source 27 is connected through commutator 22 to slip rings 42–42″ of the other decades thus setting the circuit 10 for a simultaneous transfer of the decades.

Upon rotation of the shaft 15 through approximately 15° more, the brush 24 moves to position 24c and makes electrical contact with section 0. Simultaneously with the switching from section 9 to 0, the brush 31 moves from section 28 to section 29 as shown by position 31c. With the switching of brush 31 from one section to the other, the power source 27 is connected to the slip rings 43–43″. This changes the power in the tens and hundreds decades units 33, 34, from section 9 to section 0 while the thousands decade unit 35 has power switched from section 4 to section 5.

Obviously the brushes of units 34 and 35 have moved a small amount also since all the units are mechanically connected together but this movement is so slight for the period explained, that no movement of the brushes has been shown.

It can readily be seen that all switching of the circuit 10 is controlled through successive direct switching in each decade to the preselector commutator of the lowest counter unit, thereby giving greater accuracy than heretobefore obtainable.

Figure 2:
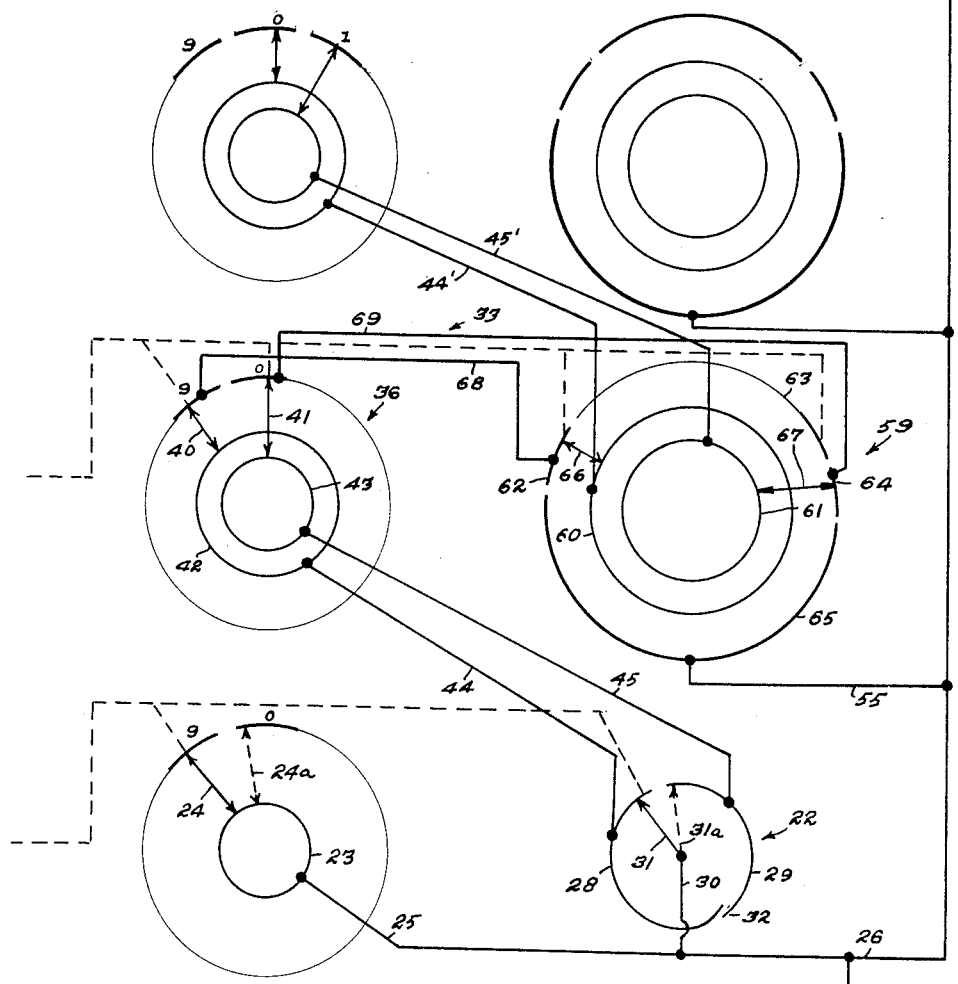
FIGURE 2 is a diagrammatic representation of a modified form of the invention.

In FIGURE 2 there is shown an improved control switching commutator 59 requiring a reduced number of rotary brushes. In this figure, like reference numerals refer to like parts as described in relation to FIGURE 1 above.

By using a plurality of commutators 59, as taught in FIGURE 2, it is possible to replace each of the units 53–53″ of FIGURE 1 with a unit requiring fewer brushes and which is easily and simply constructed. The commutator 59 is made up of two slip rings 60, 61, an outer ring having segments 62–65 and two brushes 66, 67. Conductor 55 connects the segment 65 to the bus bar 26. The 9 and 0 segments of the tens decade commutator 36 are connected by conductors 68, 69 to the segments 62, 64 respectively of the commutator 59. Segment 63 of commutator 57 is electrically insulated from the other electrical circuits and serves as an inactive segment. The two brushes 66, 67 contact the commutator segments and one each of the slip rings 60, 61. The slip rings 60, 61 are connected by conductors 44′, 45′ to the next higher decade. This form of control commutator may be used as a substitute for the units decade control.

The operation of the commutator 59 may be explained substantially as follows. With a count of 099 registered, the brushes of the various commutators are substantially as shown. With the brushes in the position illustrated, an electrical circuit is established from the power source 27, through commutator 28 and lead 44 to the slip ring 42. From the slip ring 42 a circuit is established through conductor 68, segment 62, brush 66 and slip ring 60 to the conductor 44′. From this it can readily be seen that the decade units are under the control of the units control commutator 22. Upon movement of the brush 31 from segment 28 to segment 29, the counts of the decade units will switch simultaneously to the next higher position.

Assume that the brush 31 is moved to the position shown as 31a simultaneously with the switching of brush 24 to position 24a. This movement of the brush 31 establishes a new circuit through the higher decade units thus causing instantaneous switching of the count from 099 to 100.

As the count in the tens decade accumulates, brush 67 will move along slip ring 61 until contact is made with segment 65 which establishes a circuit through conductor 55 to the bus bar 26. Brush 67 continues to control the power to the next higher decade stage until brush 67 leaves the segment 65 and contacts segment 62. At this time brush 66 will be in contact with segment 65 and will assume control over the power to the next higher decade stage until both brushes 66, 67 are again in the position shown in FIGURE 2. At this time the control of the system is switched to the next lower decade. It should be noted that both brushes will be in contact with segment 65 at the same time during a portion of the count cycle. This dual circuit does not adversely affect the next higher stage since both brushes of the higher stage are on the same segment as explained in reference to FIGURE 1.

Figure 3:
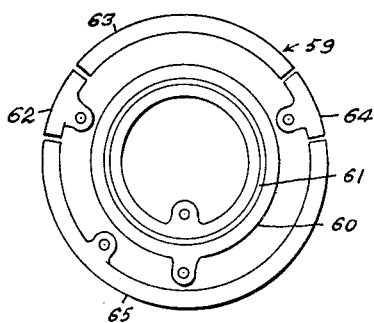
FIGURE 3 is a plane view of a control commutator built in accordance with the teaching of FIGURE 2.

FIGURE 3 shows a plan view of commutator 59. The segments 62, 64 are approximately 36 degrees in span while the segment 65 is approximately 190 degrees in span. The two continuous slip rings 60, 61 are shown located nearer the center of the commutator 59.

Obviously, many modifications and variations of the present invention are possible in the light of the above teachings. As noted above, various control commutators may be employed. It should also be noted that a circuit of this invention may be used to control a plurality of circuits which must be switched together.

An arrangement of the type disclosed in relation to this invention permits considerable relaxing of the systems tolerance otherwise required. Control must be transferred to the next lower decade between −16° and −1° of the counting or transfer point, and may be withdrawn between +1° and +16° of the counting or transfer point. Since each decade successively transfers control to the next lower decade, this tolerance does not become critical as the number of decade units is increased. The actual amount of gear play in the driver train which can be tolerated does become smaller since the accumulated error at each decade in the train must meet the stated angular tolerance.

Counting transfer time in this analog to digital converter is dependent solely on the time required for the control commutator on the units digit to perform its transfer. There is no delay due to relay or solenoid operating time. The higher stages of the counter are also constructed alike allowing the decades to be readily stacked together to form any desired counting circuit. There is also no geometric accumulation of control commutators as additional decade stages are added to the system. The use of the type control commutator used on the tens and higher decades provides a means of eliminating any possibility of a count ambiguity as a result of misalignment of the nine to zero counter segment gap and the gap in the control commutator rings. No ambiguity other than a possible units decade count error of plus or minus one can occur with this type of system.

It is to be understood that the forms of the invention herewith shown and described are to be taken as preferred examples of the same and that various changes or modifications may be made without departing from the spirit or scope of the appended claims.

What I claim is:

1. In an analog to digital converter circuit, the circuit comprising a plurality of counter units for a succession of orders of counting, each counter unit comprising a plurality of switch positions defined by commutator segments and a relatively rotatable means in slidable engagement with said segments for making successive electrical contact therewith, a gear train connected to the said relatively rotatable means for rotating the means in a fixed ratio, and preselector commutator switching systems carried by and rotatable with the relatively movable means of each counter unit, for providing direct electrical interconnection between decades in the count-transfer interval, each system comprising a commutator having active segments and movable contact means associated therewith for interconnecting the segments and movable contacts so that the transfer of the count in the higher counter units will be controlled through successive direct switching in each decade to the preselector commutator of the lowest counter unit.

2. An electrical counter for digitally translating shaft rotations into electrical impulses including a gear train, a first and second counting unit driven by the gear train at different speeds, said first and second counting unit having a commutator surface consisting of electrically conductive and insulated segments arranged in rows corresponding to digits of information, the said commutator of the first counting unit being swept by a contact means, the said commutator of the second counting unit being swept by a plurality of contact means, slip rings for each contact, a second commutator associated with both the first and second counting units, the said second commutator consisting of two conductive segments, a contact means associated with and adapted to sweep the second commutator conductive segments, a third and fourth commutator having a single conductive segment associated with the second counting unit, said third and fourth commutators having contact means associated therewith, conductor means connected between the slip rings of the second counter unit and the two conductive segments of the second commutator of the first counter unit, second conductive means connected between the slip rings of the second counter units and segments of the third and fourth commutators, means connecting the contacts of the third and fourth commutators to the segments of the second commutators of the second counter unit, output means taken from the segments of the second commutator of the second counter unit and adapted to be connected to additional counter units whereby the count of the higher counting unit is controlled through successive switching in each decade to give simultaneous transfer in the count.

3. An analog to digital converter comprising a plurality of counter unit assemblies including a first units counter unit, a second tens counter unit and a third hundreds counter unit, coupling means connecting the counter unit assemblies together for progression from one to another of these counts at different rates; said rate bearing a predetermined relationship to each other such that as the hundreds counter unit assembly progresses from one count to another the tens unit counter has progressed through a complete cycle and the units counter assembly has moved through a plurality of counting cycles, said unit counter assembly comprising a first and second commutator, said first commutator consisting of a plurality of counting segments, a contact means movable over the segments, a slip ring associated with the contact, said second commutator comprising two segments, a contact movable over the segments, power means connected to the slip ring of the first commutator and to the contact of the second commutator, said tens unit counter assembly comprising a first and second commutator, said first commutator consisting of a plurality of counting segments including a nine and zero segment, a plurality of brush contacts movable over the segments, a slip ring associated with each brush contact, said second commutator comprising first, second, third and fourth segments, a plurality of contacts movable over the segments, slip rings associated with the contacts, means for electrically connecting the segments of the second commutator of the unit counter to the slip rings of the first commutator of the tens counter, means for electrically connecting the nine and zero segments of the first commutator of the tens counter to the first and third segments of the second commutator of the tens counter, means for electrically connecting the fourth segment of the second commutator of the tens counter to the power means, said hundreds counter assembly comprising a first and second commutator having segments, brush contacts and slip rings arranged as are the elements of the tens counter unit, means for electrically connecting the slip rings of the second commutator of the tens counter to the slip rings of the first commutator of the hundreds counter, whereby the transfer in count in the higher order counter unit is successively controlled through switching by the second commutators of lower counter units.

References Cited by the Examiner

UNITED STATES PATENTS 2,496,585  2/50  Harper _____ 340—347
2,666,912  1/54  Gow et al. _____ 340—347

MALCOLM A. MORRISON, *Primary Examiner.*